United States Patent [19]
Poppinger et al.

[11] 3,780,361
[45] Dec. 18, 1973

[54] CONTROL CIRCUIT FOR AN INVERTER INCLUDING A CONTROLLED THYRISTOR IN AN INTERMEDIATE DIRECT CURRENT CIRCUIT

[75] Inventors: Herbert Poppinger; Klaus Hübner, both of Munich, Germany

[73] Assignee: Siemens Aktiengesellschaft, Berlin & Munich, Germany

[22] Filed: Feb. 22, 1972

[21] Appl. No.: 228,195

[30] Foreign Application Priority Data
Mar. 13, 1971   Germany................... P 21 12 185.7

[52] U.S. Cl. .............................................. 318/171
[51] Int. Cl............................................. H02r 7/62
[58] Field of Search.................... 318/171, 175, 231, 318/341

[56] References Cited
UNITED STATES PATENTS
3,444,451  5/1969  Schlabach et al............... 318/231 X
3,600,658  8/1971  Kuniyoshi...................... 318/175 X Primary Examiner—Bernard A. Gilheany
Assistant Examiner—W. E. Duncanson, Jr.
Attorney—Arthur E. Wilfond et al.

[57] ABSTRACT

In current converter motors, signals dependent on the rotor positions are applied to a synchronized and self-resettable timing circuit arrangement for the timed activation of a controlled thyristor. A shift in the blocking period of the rectifier toward the cycle-cutoff of the controlled inverter is also effected thereby. A mean effective value is additionally applied to the current regulating circuit which is derived from the current flowing through the controlled thyristor.

5 Claims, 2 Drawing Figures

CONTROL CIRCUIT FOR AN INVERTER INCLUDING A CONTROLLED THYRISTOR IN AN INTERMEDIATE DIRECT CURRENT CIRCUIT

The invention relates to a control circuit for an inverter supplying synchronous motors, wherein a controlled thyristor for a smoothing choke is provided in an intermediate direct current circuit between the controllable rectifiers and the controllable inverters.

Inverters are known from the prior art, which consist of controllable rectifiers and controllable inverters which include an intermediate direct current circuit containing a smoothing choke. The DC potential in the intermediate direct current circuit in these inverters is zeroized by means of a suitable control of the rectifiers for starting up synchronous rotating field motors without an extra potential source in synchronism with a multiple of the control frequency of the controlled inverters. During start-up, the control of the rectifiers takes place in dependence on the position of the motor rotor. In contrast, the necessity for controlling the rectifiers for normal rotational speeds does not occur since the commutation in that case takes place with the aid of the back e.m.f. of the machine itself.

Motors which are energized in such a manner by means of controlled inverters have an upper limit in their rotational speed, since the rate of current change in the intermediate direct current circuit is limited due to the smoothing choke. This is especially true for machines having a high polar number. It has previously been proposed, in order to increase the rate of current change in the intermediate direct current circuit, to provide a controlled thyristor in parallel with the smoothing choke, thus permitting, during the cutoff of the direct current, shortly before each commutation by means of the rectifier, the choking current to continue to flow through the controlled thyristor. As the controlled thyristor is made conductive for each commutation, the choking current is able to flow therethrough. It is then only necessary that the current be commutated through the subtransient machine reactance $L\sigma$, which customarily may be commutated for a shorter period of time in the ratio of $L_o/L\sigma \geq 10$. In this formula, $L_o$ signifies the reactance of the smoothing choke.

In controlling the rectifier and controlled thyristor in dependence on the motor rotor position, due to a possible beat between the frequencies of the controlled rectifiers and controlled inverters, correspondingly long control signals are required, which limit quite severely the range of the starting frequency.

It is an object of the invention to render possible a fast commutation of the motor current by means of a thyristor of small capacity, in spite of a beat, while, at the same time, a decrease of the currentless interval in the motor circuit takes place.

This object is attained by means of a control circuit, as proposed by the invention, wherein signals, depending on the motor rotor position, are applied to activate a mono-stable timing circuit, apart from the control of the controlled inverters. These signals with the application of separate synchronizing impulses, provide starting impulses for the timely activation of the the controlled thyristor. The signals also serve to reset the timing circuit into a condition corresponding to that prior to the arrival of the signals; and wherein, further the effective value of a current flowing through the controlled thyristor together with the effective value derived from the current in the supply source of the controlled inverter is applied to the current regulator which controls the control unit of the rectifier. Thus, the invention essentially comprises the correct phase control of the controlled thyristor forming the sole start-up means.

Through the activation of the controlled thyristor, just at the time when it is ready for current conduction, the currentless interval in the motor circuit is reduced to a minimum, whereby higher start-up frequencies and an improved uniformity in the rotational moment can be attained. Since, furthermore, no blocking losses occur in the controlled thyristor, types of smaller capacity may be used.

An undesired influence of the current regulator circuit on the rectifier control, due to the intermitten current of the rectifier, is avoided through the added influence of the current of the controlled thyristor on the regulator.

The control circuit for inverter motors of higher rated frequency may operate into the control unit of the rectifiers without additional control. This is true when the time-potential integral $\int udt = J_o \cdot L\sigma$ required for the commutation of the current $J_o$ of the intermediate circuit through the subtransient machine reactance $L\sigma$ is smaller than the negative time-potential integral of the rectifier for the start-up of the motor (blocking period $\alpha_o \approx 90°$). Only for machines with very large machine reactance $L\sigma$ is the controlled thyristor no longer sufficient as the sole means for start-up. It is therefore of advantage in the case of inverter motors with lower rated frequencies to provide a rectifier control in accordance with a further embodiment of the invention. The rectifier is controlled such that a shift in the blocking period $\alpha_o$ of the rectifier takes place in the direction of the cycle cut-off of the controlled inverter. For this purpose, the timing circuit is connected through a matching circuit into the control unit of the rectifier.

The timing circuit may be disconnected at about the time when the limit of the rotational speed $n_o = 10\% \, n_N$, since at that time, the commutation of the motor current is sufficient as effected by means of the motor back e.m.f. alone.

The control circuit as here proposed for precise determination of the current zero passage does not require any additional current transformers of high resolution, as is necessary with control circuits which include a shift of the blocking period $\alpha_o$ in the direction of the cycle cut-off of a controlled inverter for indicating the condition of a completed commutation.

With these and other objects in view, which will become apparent in the following detailed description, the present invention will be clearly understood in connection with the accompanying drawings, in which.

Figure 1:
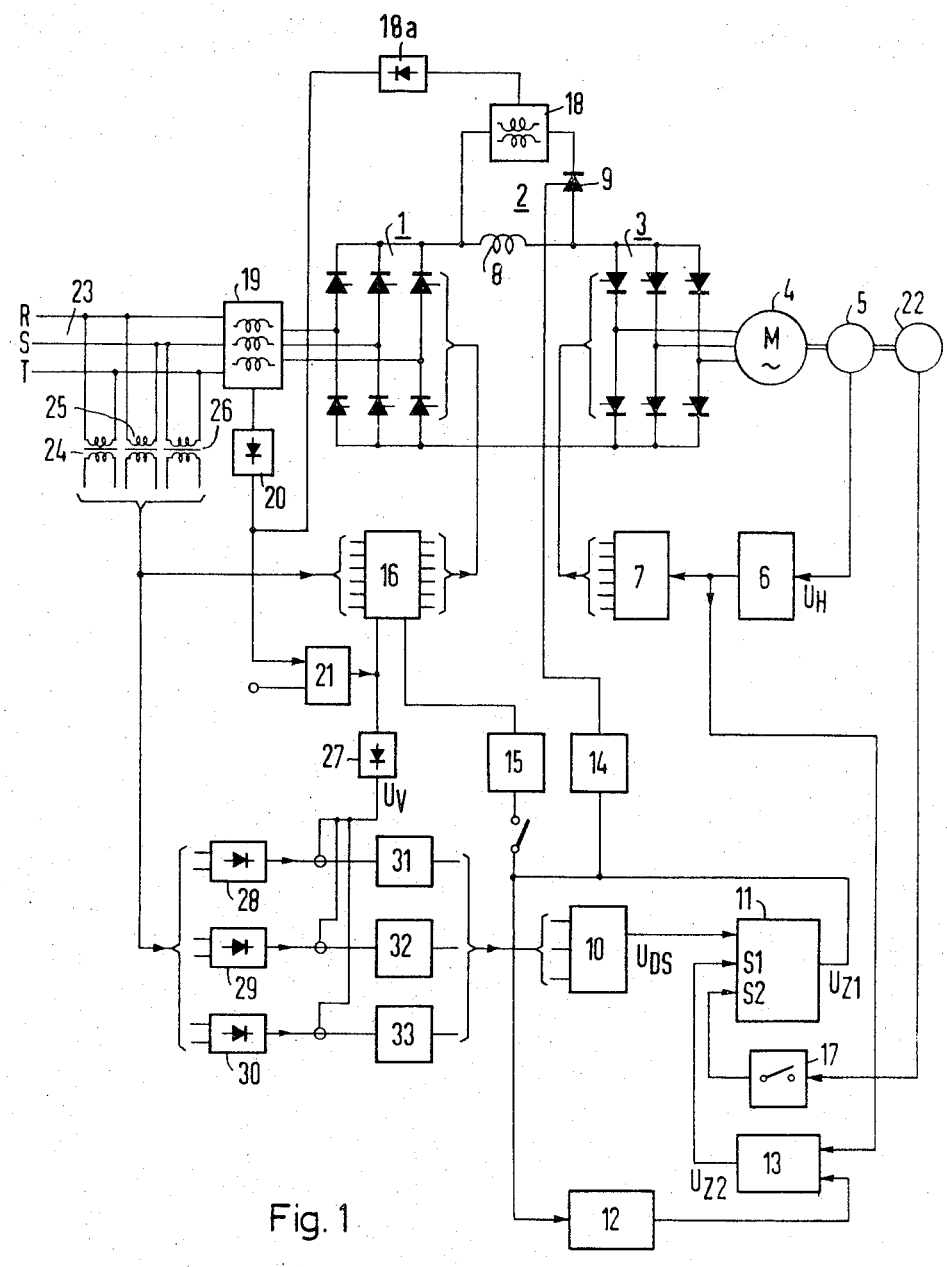
FIG. 1 shows an exemplified circuit schematic.

A controlled rectifier 1 connected as an alternating current bridge circuit supplied from the three phases R, S and T of an AC supply 23, together with an intermediate direct current circuit 2 and a controlled inverter 3, also an AC bridge circuit, forms an inverter for supplying an AC synchronous motor 4. The intermediate DC current circuit 2 includes a smoothing choke 8 and a controlled thyristor 9 in shunt therewith and in series with a current transformer 18.

A rotor position indicator 5, which is equipped with Hall generators, and a tachometer 22 are mechanically coupled to the motor rotor. The Hall potential signals $U_H$ of the rotor position indicator are applied to a differentiating circuit 6, the output signals of which are applied to the control unit 7 for the controlled inverter 3, as well as to an input of a monostable timing circuit 13. The output signal $U_{Z2}$ of this timing circuit is supplied to the input of a second monostable timing circuit 11, the blocked input S of which is connected into circuit over a rotational speed dependent switch 17 (which may, for instance, be activated by a tachometer 22). The normally open input of a second timing circuit 11 is acted upon by synchronizing signals $U_{Ds}$ derived from a differentiating circuit 10. The output signal $U_{Z1}$ of the second timing circuit 11 is applied to the controlled thyristor 9 as a timed activation signal over the amplifier circuit 14; the same output signal controls the control unit 16 of the rectifier 1 over a matching circuit 15 in the sense of an adjustment in the blocking period, as well as controlling a resetting input to the first timing circuit 13 over a differentiating circuit 12 so as to effect a reset thereof.

The synchronization of the control unit 16 is effected through signals obtained from three repeater transformers 24, 25 and 26 supplied from the AC source 23 in a manner which will be explained in more detail herein below:

The control unit 16 receives its control potential from a current controller 21 of the current regulator circuit, which receives a mean effective value current from a three-phase supply transformer 19 over a rectifier 20. In order to avoid a controlling action on the part of the current controller 21 during the currentless intervals of commutation, current is fed through the controlled thyristor 9 through the current transformer 18 and through the rectifier 18a and is applied additively in the form of direct current to the effective value input of the current controller 21. In this manner, a constant mean effective value is applied to the current controller 21 also during the commutation together with the current from the supply transformer 19.

The secondary potentials of the repeater transformers 24, 25 and 26 are also applied over the rectifiers 28, 29 and 30 to separate threshold signal generators 31, 32 and 33. Sometimes a non-interacting output potential $U_V$, which is proportional to the control potential of the control unit 16 is also added over a matching circuit 27 as input to generators 31, 32 and 33, the outputs of which are connected to the input of the said differentiating circuit 10.

Figure 2:
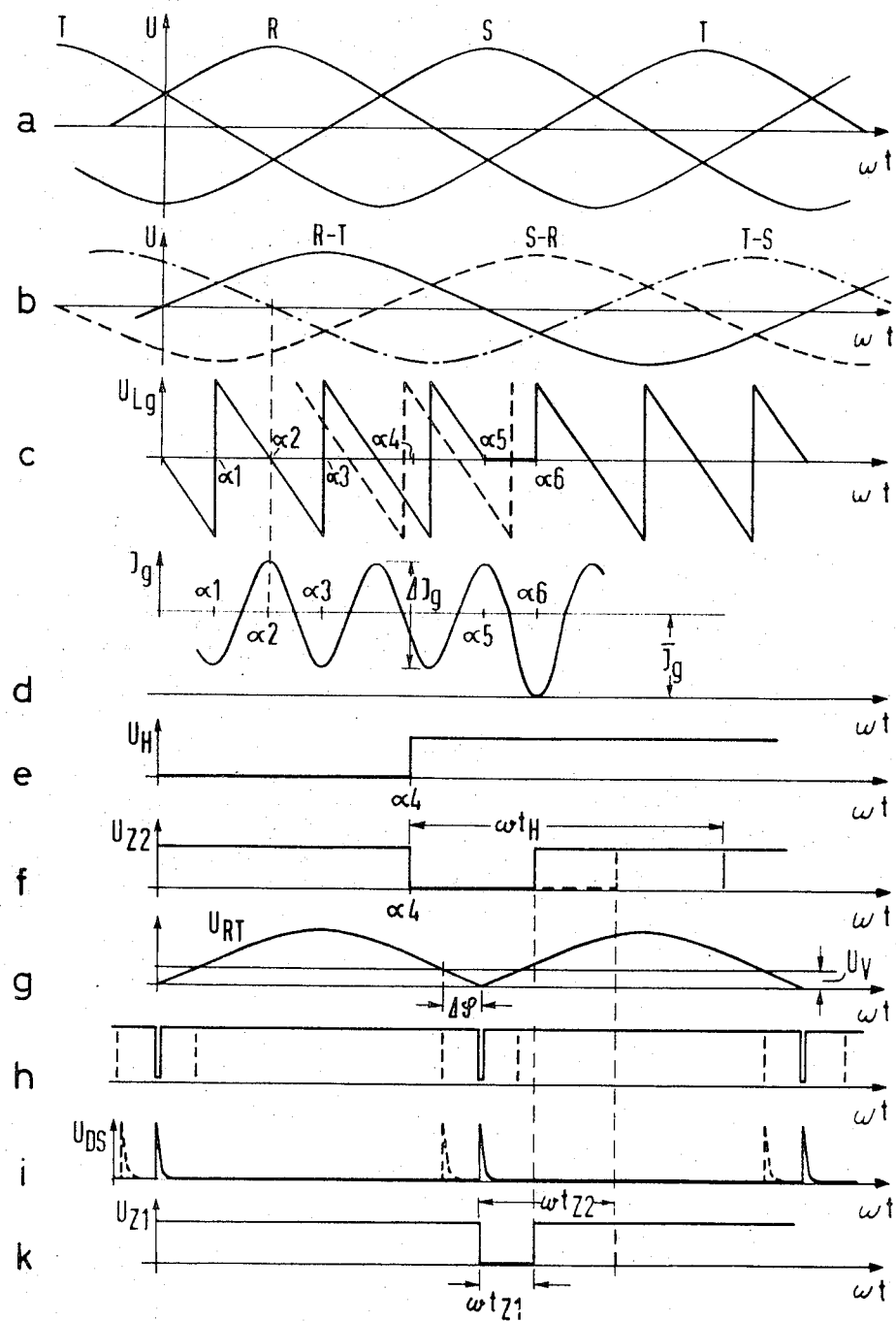
FIGS. 2a and 2k show in graph form the various current, potential, and signal patterns.

The three phase line potentials of the phases R, S and T of the AC supply 23, which are displaced by 120° electrical relative to one another, are shown in the graph FIG. 2a indicating their mutual relationships. The synchronous potentials R–T, S–R, T–S of the repeaters 24, 25 and 26 which are also displaced in phase by 120° are shown in FIG. 2b. FIG. 2c illustrates the AC potential $U_{Lg}$ at the smoothing choke 8. A value for $\alpha_g$ 4≈has been assumed, which corresponds to a low rotary speed of the motor 4 ($n \leq 0.1\ n_N$). Thus, it follows that, for instance, a controlled thyristor which is connected with its anode into phase R of the rectifier 1, becomes conductive only when the associated synchronizing potential $U_{RT}$ is positive. The controlled thyristor, however, which is connected with its cathode to phase R, may become conductive only when the associated synchronizing potential $U_{RT}$ is negative going.

The zero passages of the AC potential $U_{Lg}$ of the rectifier 1 coincide with the zero passages of the synchronizing potentials which are applied to the control unit 16 of the rectifier 1, which obtains its control potential from the rheostat 21 (output amplifier of the current regulator circuit). The secondary potentials of the repeaters, moreover, are converted in the rectifiers 28, 29 and 30 into positively pulsating DC potentials (as shown in FIG. 2f for the synchronizing potential $U_{RT}$). Their zero passages in the following threshold signal generators 31, 32 and 33 generate impulses in accordance with FIG. 2h. Synchronizing impulses $U_{DS}$ (FIG. 2i) are obtained from the descending edges of these pulses (2h) in the differentiating circuit 10 for the release of the control of the controlled thyristor 9.

As a result of an increase in the motor rate of rotation, a phase shift is obtained between the AC potential $U_{Lg}$ derived from the synchronizing potentials (FIG. 2b) and the actual AC potential (FIG. 2c) which, for a specific case, is shown in dashed lines as having a phase shift of $\Delta\phi$ since the output potential of the rectifier becomes increasingly higher.

In order to compensate the phase difference $\Delta\phi$, which is detrimental to the function of the inverter, the control potential of the current rheostat 21, which is proportional to the control angle $\alpha_g$ for the control unit 16 of the rectifier 1, is also applied to the matching circuit 27. The control potential is also superimposed on the rectified synchronized potentials (for instance, $U_{RT}$) as a frequency dependent output potential $U_V$, so that their intersections (FIG. 2g – h) provide the desired shift of the synchronizing impulses $U_{DS}$. The phase shift is proportional to the increase of the blocking period $\alpha_g$ starting from the value $\alpha_g \approx 90$.

As a consequence of the above described derivation of the synchronizing impulse $U_{DS}$, a timed activation of the controlled thyristor 9 is also obtained on the occasion of the saturation of the smoothing choke 8. It is therefore no longer necessary to rely on the presence of an AC potential at the smoothing choke, since this AC potential is reproduced by signals which are analagous and of like phase and which are not under the influence of transient phenomena.

For the specific case as described, and as shown in FIG. 2b, the direct current within the range of $\alpha_1$ to $\alpha_2$, increases from $\bar{J}_g - \frac{1}{2}\Delta J_g$ to $\bar{J}_g + \frac{1}{2}\Delta J_g$. The current increase $\Delta J_g$ is determined by the integral of the harmonic potential $\int u dt_{DB}$ of the AC rectifier bridge (surface between $\alpha_1$ and $\alpha_2$) and the inductance of the smoothing choke 8 in the intermediate DC circuit. The current, in the range of $\alpha_2$ to $\alpha_3$, decreases again by the same amount $\alpha\ J_g$. An AC current is superimposed on the effective value $\bar{J}_g$ with a frequency $= f.p.$ (where $f$ = supply frequency, $p$ = number of pulses from the rectifiers).

When at the point in time of $\omega t = \alpha_2 + n\ \pi/3$ ($n = 1, 2, 3\ ....$ ), the controlled thyristor 9 is activated, the current of the smoothing choke 8 is commutated on the controlled thyristor 9, whereby the said integral of potential $\int u dt_{DB}$ is fully available for commutating the motor current over the reactance $L\sigma$. The decrease in current $J_{gK} = \int u dt_{DB}/L\sigma$ occurring at this time is greater in the proportion $L_g/L\sigma$ than $\Delta J_g$. Since $\Delta J_g$ amounts only to a fraction of the motor current $J_g$ (usually about 10 percent) and where the proportion is $L_g/L\sigma \geqq 10$, the motor current definitely becomes zero and after commutation to the following motor winding quickly builds up again.

The synchronizing impulses $U_{DS}$ indicate to the second timing circuit the possible start of current conduction of the controlled thyristor 9, as will be explained hereinbelow.

As shown in FIG. 2e, for instance, at the point in time when $\omega t = \alpha_4$, a thyristor of the controlled inverter which, up to this point, has not been conducting, receives an activating impulse, that is, when a commutation in the controlled inverter is to take place, and thereby one of the six Hall potentials UH undergoes a change. A starting signal produced in the differentiating circuit 6 by means of the triggering edge of the Hall potential is applied to the input of the first timing circuit 13. Output signal $U_{Z2}$ of timing circuit 13, having an operating period $t_H$, is applied to the input S1 of the second timing circuit 11. At the occurrence of the synchronizing signal $U_{DS}$, as in FIG. 2k, circuit 11 provides an output signal $U_{Z1} =$ "1" to the controlled thyristor 9 over the output circuit 14 and renders it conductive. A restoring signal is provided by the positive going edge of the output signal $U_{Z1}$ having a period $t_z$ ($t_{z1}$ to $t_{z2}$) corresponding to the duration of the activating impulse from the differentiating circuit 12 for the reset input of the first timing circuit 13 whereby the output signal $U_{Z2}$ disappears.

The output signal $U_{Z1}$ of the second timing circuit 11 may, in the case of lower rated frequencies, be applied as a control signal to the control unit 16 through the matching circuit 15 of rectifier 1 for the purpose of shifting the blocking period $\alpha_g$ toward the cycle cut-off of the controlled inverter. This will occur, where due to the high motor inductance $L\sigma$, as a consequence of the lower rated frequencies, the time integral of the potential $\int u dt_{DB}$ is not sufficient for commutation. The said shift in the blocking period takes place during the active period $t_{Z1} \geqq \pi/3\omega (\omega = 2\pi f_{A.C.})$ of the timing circuit 11, thus effecting the required increase of the negative potential time integral of AC potential $U_{LG}$.

Smaller periods $t_{Z2} = \pi/3\omega$ are satisfactory whenever the time integrals of the potential are sufficient for commutation.

The operative period $t_H > \pi/3\sigma$ is of secondary importance. A bistable trigger circuit may also replace the timing circuit 13, which is superimposed on the output signal of the differentiating circuit 6 and is restored by the differentiating circuit 12.

At the end of the start-up period, and as soon as the motor has achieved a sufficiently high level in the speed of rotation $n_{gr} \approx 1/10\ n_N$, the second timing circuit 11 is cut off by the switch 17 in response to the rotational speed and the entire start up circuit is thereby disconnected. Subsequently, the control of the rectifiers and controlled inverters depends entirely on the current regulator 21 or the rotor position indicator 5, the controlled thyristor remaining continuously blocked thereby.

While we have disclosed several embodiments of the present invention, it is to be understood that these embodiments are given by example only and not in a limiting sense, the scope of the present invention being determined by the objects and the claims.

It is claimed:

1. In a circuit for energizing a synchronous motor which includes a rectifier circuit for converting the A.C. from a supply source to D.C., an inverter circuit connected to be supplied from said rectifier circuit for inverting the D.C. into A.C.; a synchronous motor connected to be supplied from said inverter circuit having a rotor, and a D.C. circuit intermediate said rectifier and inverter circuits including a smoothing choke and a controlled thyristor in parallel circuit solely with said choke; a circuit for controlling said thyristor comprising means for deriving a signal in response to the angular position of said rotor, a timing signal generating means, means for applying the output of said deriving means to said timing means and to said inverter circuit, means for deriving synchronizing signals from the A.C. supply source connected to apply said synchronizing signals to said timing means, means for applying the signals of said timing means to said thyristor and second means for deriving a signal from said timing means for effecting a restoration thereof, means for controlling said rectifier, and means for applying the signals of said timing circuit to said last named controlling means for regulating the phase angle of operation thereof.

2. The circuit according to claim 1, further including circuit switching means for said timing means, and means for activating said circuit switching means in response to a given rate of rotation of said rotor.

3. The circuit according to claim 1 further including means for applying a current to said rectifier controlling means which is proportional to the mean effective value of the current through said thyristor and to the current of the source of supply for said rectifier-inverter circuit.

4. The circuit according to claim 3, further including means for deriving a first rectified potential corresponding to the current through said thyristor and a second rectified potential corresponding to respective phase potentials of said supply, means for comparing said rectified potentials, and means for obtaining synchronizing pulse signals from said comparing means for controlling said timing circuit.

5. The circuit according to claim 2, wherein said timing signal generating means includes a first monostable timing circuit controlled by said rotor position signal generator, and means for restoring said first timing circuit; a second monostable timing circuit, means for controlling said second timing circuit including said first timing circuit, said circuit switching and said switching circuit activating means, and said synchronizing signal deriving means; a circuit for differentiating the output timing pulses of said second timing circuit and for applying the resulting signals to said second timing circuit for the restoration thereof; and means for connecting the output of said second timing circuit for controlling said thyristor and said rectifier circuit.

* * * * *